(12) United States Patent
Cabrera et al.

(10) Patent No.: US 7,254,579 B2
(45) Date of Patent: Aug. 7, 2007

(54) USING ENDPOINT REFERENCES IN A PUB-SUB SYSTEM

(75) Inventors: Luis Felipe Cabrera, Bellevue, WA (US); Geary L. Eppley, Carnation, WA (US); Jeffrey C. Schlimmer, Redmond, WA (US); David Wortendyke, Seattle, WA (US); Bradford H. Lovering, Seattle, WA (US); Craig A Critchley, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 10/801,998

(22) Filed: Mar. 15, 2004

(65) Prior Publication Data

US 2005/0203949 A1    Sep. 15, 2005

(51) Int. Cl.
*G06F 17/30*    (2006.01)
(52) U.S. Cl. .......................... 707/10; 707/100; 709/203

(58) Field of Classification Search .................. 707/10, 707/100; 709/203
See application file for complete search history.

(56) References Cited

U.S. PATENT DOCUMENTS

| | | | |
|---|---|---|---|
| 2002/0143944 A1* | 10/2002 | Traversat et al. | 709/225 |
| 2004/0019645 A1* | 1/2004 | Goodman et al. | 709/206 |
| 2005/0021836 A1* | 1/2005 | Reed et al. | 709/238 |
| 2005/0144298 A1* | 6/2005 | Samuel et al. | 709/230 |

* cited by examiner

*Primary Examiner*—Cheryl Lewis
(74) *Attorney, Agent, or Firm*—Lee & Hayes, PLLC (57) ABSTRACT

Systems and methods for using endpoint references in a publish-subscribe system are described. In one aspect, an endpoint reference is created by a component of the pub-sub system. The endpoint reference includes an endpoint address and one or more contexts. Each context is directed to a respective component of the pub-sub system. Each context is transparent to the respective component, and selectively opaque to all other pub-sub system components.

30 Claims, 5 Drawing Sheets

USING ENDPOINT REFERENCES IN A PUB-SUB SYSTEM

TECHNICAL FIELD

The following subject matter pertains to Web services.

BACKGROUND

A Web service is programmable application logic accessible using standard Internet protocols. Publish-subscribe ("pub-sub") Web service systems provide mechanisms for a Web service to register interest in receiving messages when events occur in other services and applications. For instance, messages generated by publishers may be forwarded to a central messaging hub or broker that in turn sends these messages to subscribers that have previously subscribed to receive some or all of these messages. A "subscriber" may send a request message indicating interest, or "subscription", to an "event source" (another Web service) regarding notifications about certain events (e.g., current stock quotes, etc.). The request indicates that such event notifications are to be sent by the event source to an "event sink." In a simplest scenario, the subscriber is the event sink. In another scenario, the subscriber is a third party independent from the event sink that manages the subscription for the event sink.

A subscriber may want to include context, cookies, or other non-standard data within each event notification sent by an event source to an event sink as part of a subscription. For purposes of discussion, such non-standard data is hereinafter often collectively referred to as "context". Such context, for example, may be used by the event sink and/or an intermediary (a gateway, firewall, etc.) to configure operations, to transmit state or other data to the subscriber, etc. For instance, a security intermediary may use context included with an event notification to discard notifications that do not include an appropriate authorization token (context); a logging intermediary may use the non-standard data to log events that are part of a business relationship, and so on.

Unfortunately, a subscription request message from a subscriber to an event source is not designed to encapsulate such context. In particular, a subscription request is designed to encapsulate only a minimal amount of information—typically a 128-bit GUID or a Universal Resource Identifier (URI) address (network or logical) of an event sink. Accordingly, to include context within a subscription request, a subscriber typically modifies the request in a proprietary manner to add any context with the message. This means that components in a pub-sub system that desire to transmit context to another entity must share a common set of assumptions with at least that entity about how context in a subscription and/or event notification message is to be parsed, and subsequently interpreted. When an event source sends the context to the entity, for instance, with an event notification, the event source must at a minimum be able to decode the additional information present in the subscription. Instructions to implement such decoding of context information may have been provided via a document, a phone call, a piece of code sent to an event source developer, etc. Additionally, every time the subscriber wants to change the amount or the format of the additional data (context) it is likely that the event source will need to change as well to decode this new style.

For example, a subscriber may serialize context within the GUID or URI address of the event sink. Alternatively, the subscriber may add a data field to the structure of the subscription request to hold the context. Regardless of the manner in which the context is inserted into the subscription request, there must be tight coupling between the subscriber and the event source to extract, parse, and maintain such context. Additionally, serialization of context within a 128-bit GUID or URI substantially limits the format and quantity of the context being conveyed.

Intermediaries may have differing context requirements, such as authentication criteria. Additionally, certain context may need to be hidden from some recipients. This is because all intermediaries that receive context during normal communication flow of an event notification to an event sink may not be within a same trust domain. That is, one intermediary may not have authorization to access to context of another intermediary. These additional requirements result in even tighter coupling requirements between pub-sub components. Such tight coupling between pub-sub components is undesirable because respective components are generally more expensive and time consuming to create and maintain. Moreover, since context extraction for forwarding with event notifications is performed based on event source implementations, the subscriber has little, if any, control over the information sent to intermediaries and event sinks once the information has been sent to the event source.

SUMMARY

Systems and methods for using endpoint references in a publish-subscribe system are described. In one aspect, an endpoint reference is created by a component of the pub-sub system. The endpoint reference includes an endpoint address and one or more contexts. Each context is directed to a respective component of the pub-sub system. Each context is transparent to the respective component, and selectively opaque to all other pub-sub system components.

BRIEF DESCRIPTION OF THE DRAWINGS

In the figures, the left-most digit of a component reference number identifies the particular figure in which the component first appears.

DETAILED DESCRIPTION

Overview

The following described systems and methods use endpoint references in a pub-sub system to reduce programmatic dependencies (coupling) between pub-sub components. An endpoint reference is a simple yet powerful mechanism for addressing entities managed by a service and for inserting selectively opaque context information into messages. Such context is transparent to a targeted entity and selectively opaque to others; context opacity being a function of message content design. An entity targeted to receive such context may include any combination of the initial recipient of the message, and/or other entities (e.g., intermediaries, event sinks, subscribers, etc.) in the pub-sub communications network. While context could be encoded in an ad-hoc manner within a URL of the service, the endpoint references provides a standard Extended Markup Language (XML) element that enables a structured approach to encoding fine-grained addressing and selectively opaque context encapsulation. Use of endpoint references to enhance a messaging model enables Web services to be used to support many business scenarios besides the pub-sub system described herein.

These and other aspects of the systems and methods for using endpoint references in a pub-sub system are now described in greater detail.

An Exemplary System

Turning to the drawings, wherein like reference numerals refer to like elements, the systems and methods for using endpoint references in a pub-sub system are described and shown as being implemented in a suitable computing environment. Although not required, the systems and methods are described in the general context of computer-executable instructions, such as program modules, being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
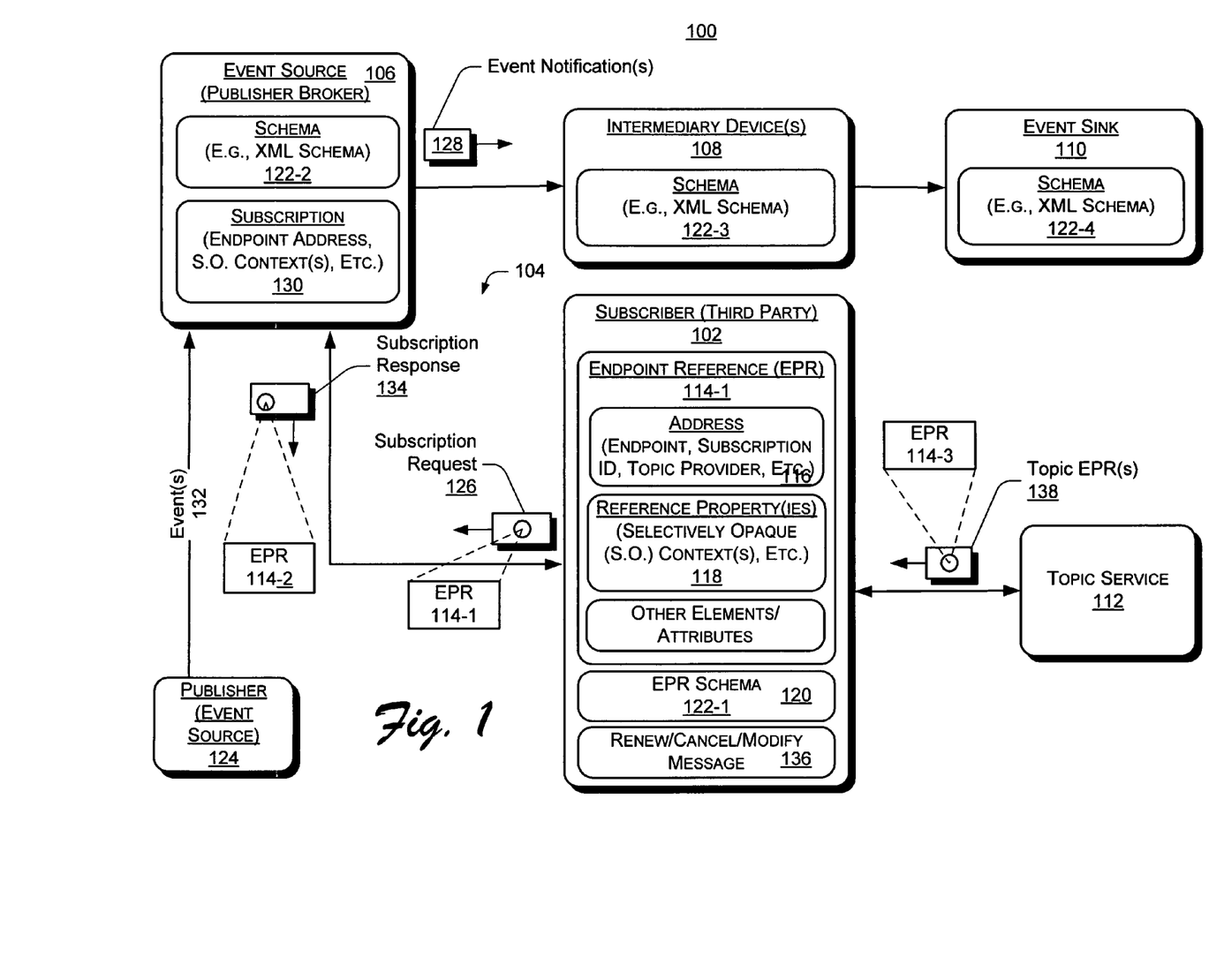
FIG. 1 shows an exemplary publish-subscribe system for using an endpoint references to create a subscription.

FIG. 1 shows an exemplary publish-subscribe ("pub-sub") system 100 for using endpoint references to provide event notification context to one or more system components. In this implementation, system 100 includes subscriber 102 coupled across communications network 104 to event source 106, any number of intermediary device(s) 108, event sink 110, and topic service 112. Communication network 104 may include any combination of a local area network (LAN) and a general wide area network (WAN) communication environments, such as those which are commonplace in offices, enterprise-wide computer networks, intranets, and the Internet.

Subscriber 102, event source 106, intermediary device(s) 108, event sink 110, and topic service 112 respectively represent any type of computing device such as a personal computer, a laptop, a server, a mobile computing device (e.g., a cellular phone, personal digital assistant, or handheld computer), etc. In this implementation, intermediary device 108 represents any device on communication network 104 that receives event notification messages as part of network communications from event source 106 to event sink 110. Such intermediary devices 106 include, for example, gateway(s), firewall(s), endpoint manager(s), and so on.

Component(s) of system 100 use endpoint references 114 (e.g., endpoint references 114-1 through 114-3) to identify message senders and receivers in pub-sub system 100, and to encapsulate selectively opaque context information into messages. Such context is not encoded in an ad-hoc manner within a URL of the service. Instead, the endpoint references provides a standard Extended Markup Language (XML) element that enables a structured approach to encoding fine-grained addressing and encapsulation of any selectively opaque context. An exemplary structure and schema for an endpoint reference 114 is now described.

Exemplary Endpoint Reference Structure and Schema

An endpoint reference 114 comprises at least a subset of the following abstract properties:

[address]: An address URI 116 that identifies an endpoint. In this implementation, an endpoint is a network address or a logical address that identifies and entity that is to receive benefit of an action (e.g., a subscription) associated to the message that encapsulates the endpoint reference. For instance, a message from a third-party subscriber 102 may direct event source 106 to create a subscription to send event notifications associated with the subscription to the endpoint (e.g., event sink 110).

[reference properties]: xs:any (0 . . . unbounded)—A reference property 118 that may contain one or more individual properties to identify an entity (e.g., subscriber, etc.) or resource (e.g., message, etc.) being conveyed. Reference identification properties properly dispatch context to endpoint(110 at the endpoint side of the interaction and/or any intermediaries 108.

[any other elements or attributes]—"Other elements/attributes" 120 include, for example:

[selected port type]: a qualified name (QName) of a primary portType of the endpoint being conveyed QNAME is defined in context of the known W3C WSDL specification.

[service-port]: (QName, non-colonized name (NCName as defined by W3C)) (0 . . . 1))—This is a QName identifying a Web Service Description Language (WSDL) service element that contains a definition of the endpoint 110 being conveyed. The service name provides a link to a full description of the service endpoint 110. In one implementation, a non-qualified name identifies the specific port in the service that corresponds to endpoint 110.

[policy]: wsp:policy (0 . . . unbounded)—A configurable number of Extensible Markup Language (XML) policy elements describing behavior, requirements, and/or capabilities of the endpoint. Policies may be included in an endpoint to facilitate easier processing by the consuming application, or because the policy was dynamically generated.

An Exemplary Endpoint Reference Schema

This section defines an exemplary endpoint reference schema 122 (e.g., schemas 122-1 through 122-4) for enforcing and parsing structure and content of an endpoint reference 114. An exemplary schema 122 is shown in TABLE 1, for enforcing representation of endpoint reference 114 as an XML type (tmda:EndpointReferenceType) and as an XML element (<tmda:EndpointReference>).

TABLE 1

AN EXEMPLARY XML SCHEMA FOR AN ENDPOINT REFERENCE

```
<tmda:EndpointReference>
   <tmda:Address>xs:anyURI</tmda:Address>
   <tmda:ReferenceProperties> . . . </tmda:ReferenceProperties> ?
   <tmda:PortType>xs:QName</tmda:PortType> ?
   <tmda:ServiceName
 PortName="xs:NCName"?>xs:QName</tmda:ServiceName> ?
  <wsp:Policy/> *
</tmda:EndpointReference>
```

In this implementation, exemplary attributes and elements of the endpoint reference schema of TABLE 1 include, for example:

/tmda:EndpointReference—This represents an element of type tmda:EndpointReferenceType. This example uses a predefined <tmda:EndpointReference> element, but any element of type tmda:EndpointReferenceType may be used.

/tmda:EndpointReference/tmda:Address—This element (of type xs:anyURI) specifies the [address] property of the endpoint reference. This address may be a logical address or identifier for the service endpoint.

/tmda:EndpointReference/tmda:ReferenceProperties/— This element contains elements that convey the [reference properties] of the reference. As described below, such reference properties are selectively opaque in that they can be designed to be opaque to certain pub-sub system 100 components and transparent to other pub-sub components.

/tmda:EndpointReference/tmda:ReferenceProperties/ {any}—Each child element of ReferenceProperties represents an individual [reference property].

/tmda:EndpointReference/tmda:PortType—This element (of type xs:Qname) specifies the value of the [selected port type] property of the endpoint reference.

/tmda:EndpointReference/tmda:ServiceName—This element (of type xs:QName) specifies the <wsdl:service> definition that contains a WSDL description of the endpoint being referenced.

/tmda:EndpointReference/tmda:ServiceName/@Port-Name—This attribute (of type xs:NCName) specifies the name of the <wsdl:port> definition that coresponds to the endpoint being referenced.

/tmda:EndpointReference/wsp:Policy—This element specifies a policy that is relevant to the interaction with the endpoint.

/tmda:EndpointReference/{any}—This is an extensibility mechanism to allow additional elements to be specified.

/tmda:EndpointReference/@{any}—This is an extensibility mechanism to allow additional attributes to be specified.

Although endpoint reference schema 122 has been described with a certain number and type of attributes and elements, the number and type of elements may change as a function of implementation design. For instance, in one implementation, tmda:PortType, tmda:ServiceName, tmda: ServiceName/@PortName, and/or wsp:Policy elements and attributes of schema 122 are optional elements.

Exemplary Utilization of Endpoint References in a Pub-Sub System

In one implementation, an endpoint address 114-1 provides an address (endpoint) to event sink 110, which is targeted to receive event notifications as part of normal communications flow during subscribe and event notification operations. In another implementation, the endpoint addresses event source 106 in a response to receipt of a subscription request message. (Event source 106 is a "publisher broker", namely a service that receives notifications from publisher(s) 124 and re-publishes them. In this context, publisher 124 is also a type of event source. Although event source 106 and publisher 124 may be respective hybrids of event source/broker functionalities, for purposes of discussion, event source 106 is a publisher broker and publisher 106 is a event source for the publisher broker). In another implementation, the endpoint addresses a topic identifier supplied by topic service 112 in response to a request from subscriber 102 for a list of topics. In each of these implementations, the endpoint reference may comprise selectively opaque context directed to one or more components (e.g., event source 106, one or more intermediaries 108, event sink 110, and/or publisher 124). Each of these implementations are now described in greater detail.

Exemplary Use of Endpoint References for Transmitting Context

In this implementation, subscriber 102 utilizes an endpoint reference 114 to communicate selectively opaque context to particular ones of the pub-sub components such as the event source 106, intermediary device(s) 108, and/or event sink 110. In particular, subscriber 102 sends subscription request 126 to event source 106 to register a "subscription" with event source 106. Subscription request 126 encapsulates endpoint reference 114-1. Endpoint reference 114-1 comprises address 116, which, in this implementation, is a network or logical address of event sink 110. endpoint reference 114-1 further comprises any number of reference properties 118. Each reference property 118 specifies one or more "selectively opaque" context(s). Selectively opaque means that only the target of the context can decode/ understand what the context means. Other processing entities in the path of the message will not necessarily know how to correctly interpret the data in the context.

For example, endpoint reference 114-1 may comprise a first and second reference property (RP) 118. The first RP may direct a first set of context to a particular intermediary 108 (e.g., gateway, etc.), whereas the second RP may direct a second set of context to the event sink 110. The first and second sets of context may be the same context. However, the first and second contexts may also be different context, wherein context semantics may only be meaningful, or transparent, to the targeted component(s) and opaque to all other components. Use of endpoint reference 114-1 in this manner to transmit context means that subscriber 102 is provided with substantially complete control over context content. Moreover, subscriber 102 is allowed to have selective control of which component(s) of the pub-sub system 100 to which the context will be opaque, and which component(s) are able receive and parse context, or correctly decode the parsed context. In this implementation, there are at least two possible kinds of context opacity: (1) an entity cannot parse the context; and (2) an entity can parses the context but one cannot make sense of the data in the context. In this implementation, selectively opaque context(s) are formatted using XML.

Exemplary Endpoint Reference Addressing

To encapsulate endpoint reference 114-1 into subscription request 126, subscriber 102 maps information from subscription 140 to event notification 128. This mapping is performed based on transport model decoupled addressing, or "TMD-addressing." TMD-addressing is protocol specific binding of information in an endpoint reference 114 into another message such as to subscription request 126. Such binding is performed based on a transformation dependent on the protocol and data representation used to the message that encapsulates an endpoint reference 114. TMD-addressing, provides an interoperable, transport independent approach to identifying message senders and receivers. TMD-addressing also provides a finer grain approach to identifying specific elements within a service that send or should receive a message.

Existing systems using Web services encode the destination for a Web service message with a URL that is placed in the transport (e.g., HTTP, SOAP over TCP, etc) used for Web service communication. The destination for the response is determined by the return transport address. One conventional approach builds on the basic browser-server model of HTTP. Using this conventional approach, the source and destination information are not part of the message itself. This can cause several problems. The information can be lost if a transport connection terminates (for example, if the response takes a long time and the connection times out) or if the message is forwarded by an intermediary such as a firewall. In contrast to such conventional addressing, TMD-addressing places the target, source and other important address information directly within the Web service message. In short, TMD-addressing decouples address information from any specific transport model.

In many scenarios messages are targeted directly to a service and the addressing information in the message can be described simply using a URL. But in practice, we often find that messages are targeted to specific elements or resources within a service. For example, a coordination service might be coordinating many different tasks. The coordinator needs to associate most incoming messages with a specific task instance that it manages and not the coordination service itself.

TMD-addressing of this implementation utilizes the mechanism of an endpoint reference 114 for addressing entities managed by the service. While such information could be encoded in an ad-hoc manner within the URI of the service, as in conventional systems, the endpoint references provides a standard XML element—the references property(ies) element 118—that enables a structured approach to encoding this fine-grained addressing. The combination of fine-grain control over addressing coupled with the transport-neutral encoding of the message source and destination enables Web service messages to be sent across a range of transports, through intermediaries, and it enables both asynchronous and extended duration communication patterns.

TMD-addressing also enables a sender to indicate where a response should go in a transport-independent manner. The response to a message may not necessarily go to the sender. Using the HTTP transport, for example, without WS-Addressing it is generally impossible to specify that the response should be sent elsewhere. These enhancements to the messaging model enable system 100 to be used to support many publication-subscription scenarios. For example, TMD-addressing provides a general mechanism to associate incoming or outgoing messages with specific tasks. The mechanism that the service uses is transparent to those using the service through an endpoint reference 114.

For additional information on TMD-addressing, please refer to U.S. patent application Ser. No. 10/801,999, titled "Open Content Model Web Service Messaging", filed on Mar. 15, 2004, commonly assigned hereto, and hereby incorporated by reference.

In this implementation, TMD-addressing uses Simple Object Access Protocol (SOAP) to bind an endpoint address and selectively opaque context endpoint reference 114-1 into subscription request 126, although other binding such as Web Service Description Language (WSDL) bindings or policies could also be utilized. (SOAP messages are independent of any operating system or protocol and may be transported using a variety of Internet protocols, including TCP/IP, UDP/IP, SMTP, MIME, and HTTP). TABLE 3 shows an exemplary subscription request 126. The exemplary subscription request 126 of TABLE 3 is expressed in an XML namespace. Prefixes are arbitrary and not semantically significant. The following illustrate a number of exemplary prefixes used in TABLE 3.

TABLE 3

AN EXEMPLARY SUBSCRIPTION REQUEST (01) <s12:Envelope
(02)  xmlns:s12='http://www.w3.org/2003/05/soap-envelope'
(03)  xmlns:tmda='http://schemas.xmlsoap.org/ws/2003/03/addressing'
(04)  xmlns:wse='http://schemas.xmlsoap.org/ws/2004/01/eventing'
(05)  xmlns:ew='http://www.example.com/warnings'>
(06) <s12:Header>
(07)  <tmda:Action>
(08)   http://schemas.xmlsoap.org/ws/2004/01/eventing/Subscribe
(09)  </tmda:Action>
(10)  <tmda:MessageID>
(11)   uuid:d7c5726b-de29-4313-b4d4-b3425b200839
(12)  </tmda:MessageID>
(13)  <tmda:ReplyTo>
(14)   <tmda:Address>http://www.example.com/MyEventSink</tmda:Address>
(15)  </tmda:ReplyTo>
(16)  <tmda:To>http://www.example.org/oceanwatch/EventSource</tmda:To>
(17) </s12:Header>
(18) <s12:Body>
(19)  <wse:Subscribe>
(20)   <wse:NotifyTo>
(21)    <tmda:Address>
(22)     http://www.example.com/MyEventSink/OnStormWarning
(23)    </tmda:Address>
(24)    <tmda:ReferenceProperties>
(25)     <ew:MySubscription>2597</ew:MySubscription>
(26)    </tmda:ReferenceProperties>
(27)   </wse:NotifyTo>
(28)  </wse:Subscribe>
(29) </s12:Body>
(30) </s12:Envelope>
(31)

s - (SOAP 1.1 (s11) or SOAP 1.2 (s12));
tmda - TMD-Addressing;
ew - a name space well-known to the originator of the end-point reference
wse - Web service (WS) eventing;
wsp - WS-Policy Assertions; and
xs - XML Schema 122.

Lines (07-09) of Table 3 indicate the message is a request to create a subscription, and Line (16) indicates that it is sent to a hypothetical event source of ocean events. While Lines (13-15) indicate where a reply should be sent, lines (20-27) indicate where notifications should be sent; there is no requirement that these match. Note that Lines (24-26) illustrate a pattern where the event sink lists a reference property (Line 25) that identifies the subscription for inclusion in each notification.

Subscription Creation and Fulfillment

Responsive to receiving subscription request 126, event source 106 creates a subscription 130. The subscription directs event source 106 to send event notification(s) 128, each of which correspond to events from publisher 124, to an event sink (e.g., event sink 110 when the subscription specified event sink 110). During subscription creation, event source 106 verifies that the requestor is authorized to create a subscription, and if so, evaluates references property(ies) 118 portion of subscription request in view of schema 122-2 (e.g., an XML schema as shown above in TABLE 2). Such evaluation determines whether any context is directed to event source 106 via an XML element called tmda:ReferenceProperties. If so, source 106 may extract from the collection of headers in the SOAP message a set that represents a context that only it can correctly interpret. These headers do not come within a ReferenceProperties element, but are mixed with other headers that may be in the SOAP message. In this scenario, any context not addressed to event source 106 is selectively opaque to event source 106, as determined by subscriber 102 when generating endpoint reference 114-1. Event source 106 block copies and stores those context(s) 140 directed to it for subsequent inclusion with an event notification 128 to event sink 110. For purposes of discussion, information block copied from endpoint reference 114 by event source 106 to create and fulfill the subscription is shown as subscription 130, which includes at least an endpoint address and any selectively opaque context directed to components other than event source 106.

Responsive to receiving subscribed-for event 132 from publisher 124, event source 106 generates event notification 128 by mapping information from subscription 140 to event notification 128. This mapping is performed as per TMD-addressing specifications described above. During this binding, event source 106 block copies the endpoint address portion of subscription 130, which corresponds to address 116 of endpoint reference 114, to a destination header field in event notification 128. Selectively opaque context portions of subscription 130 represent each reference property 118 of endpoint reference 114-1. Each corresponding reference property 118 portion of the selectively opaque context is block copied to a respective header bock in event notification 128. This means that the context information item of each reference property 118, including any and all of its children and in-scope namespaces is/are added as a respective header block to event notification 128.

Event source 106 communicates event notification 128 across communication network 104 to event sink 110. If notification 128 passes through an intermediary 108, the intermediary evaluates each of the SOAP headers in view of a respective schema 122-3 to determine if any one or more headers comprises context directed to the intermediary. If so, the intermediary extracts and parses evaluates semantics of such directed context in view the schema. Any context not directed to the intermediary is ignored by the intermediary and passed on through the communication network 104 to any other intermediary(ies) and event sink 110. Each of the any other intermediaries and event sink 110 evaluate event notification header information for context directed to the particular entity as described above. If such context is identified it is evaluated by the component using analogous components and techniques.

In view of the above, the described systems and methods for use of an endpoint reference 114 in a pub-sub system 100 substantially decouples event publisher 124 from subscriber 102 and provides for lightweight event publisher 124 implementations. In addition, the event source 106 does not need to have any special logic or knowledge of the specific context information sent by the subscriber 102. This allows simpler event source 106 to be built. One reason for this is because event source 106 evaluates only context specifically directed to the event source, if any. Context not for the event source and/or for any other components in the pub-sub system is not parsed from an event sink address GUID or URI or from a proprietary (subscriber specific) data field in a subscription. This is in stark contrast to conventional pub-sub systems, wherein an event source must use sophisticated programming to parse and strip any and all context in a subscription request from other information, regardless of whether it directly pertained to event source processing.

Such decoupling also extends to any intermediaries 108 and event sink 110; because these components have greater independence from subscriber 102 and event source 106, as compared to in conventional pub-sub systems. In particular, event sink 110 and any intermediaries 108 do not need sophisticated programming to parse and evaluate all context(s) in an event notification 128. Only information that is specifically directed to a component is evaluated, all other context can be ignored. This allows intermediaries with different context authentication criteria to receive appropriate context and provides for proper management of context(s) communicated across different trust domains.

Exemplary use of Endpoint References for Managing Subscriptions

An event source may act as a broker for any number of different subscriptions. When a subscriber requests to manage a particular subscription, the event source must be able to identify the particular subscription. To this end, after creating a subscription in a conventional pub-sub system, the event source returns an identifier (ID) and any context that may be needed by the event source to subsequently identify and manage the subscription. This information is typically serialized into the GUID or URI address or proprietary data field of a subscription response message. This is substantially limiting, since it provides the subscriber with little or not control over how a subscription and other related information is represented in the response. If the subscriber 102 desires to manage the subscription in any way, the subscriber as to be designed to extract the serialized subscription information from the response, in whatever embedded representation used by the event source, for subsequent return to the event source. For the reasons already described, such a requirement results in undesirable tight coupling between event source and subscriber components.

The systems and methods of FIG. 1 for use of an endpoint reference in a pub-sub system address this limitation of conventional pub-sub systems. In particular, rather than requiring an interested subscriber 102 to extract subscription information embedded in a URI, GUID, or proprietary data field, event source 106 embeds such information into an endpoint reference 114-2, which in turn is bound to a subscription response 134 for communication to subscriber 102. Thus, event source 106 has created an endpoint reference for the specific subscription itself. The endpoint address is the address (network or logical) of the subscription (e.g., event source 106, or in an instance wherein the publisher does not with to remain anonymous, publisher 124). In this scenario, endpoint reference 114-2 reference property(ies) elements comprise context directed to the subscriber 102, and comprising semantics understandable and used by the subscription provider (event source 106) to identify and modify (renew/cancel/modify criteria) the subscription when requested by a subscriber 102. That is, subsequent requests from this particular subscriber 102 can be "tagged" with properties (context) from this EPR 114-2 to assist the event source in processing these requests-this context is selectively opaque to the subscriber 102, and may only be useful to the event source. This context is stored by 102 with no specific knowledge of its content because of this EPR approach.

TABLE 4 shows an exemplary subscription response 134.

TABLE 4

AN EXEMPLARY SUBSCRIPTION RESPONSE (01) <s12:Envelope
(02) xmlns:s12='http://www.w3.org/2003/05/soap-envelope'
(03) xmlns:tmda='http://schemas.xmlsoap.org/ws/2003/03/addressing'
(04) xmlns:wse='http://schemas.xmlsoap.org/ws/2004/01/eventing'
(05) xmlns:ow='http://www.example.org/oceanwatch'>

TABLE 4-continued

AN EXEMPLARY SUBSCRIPTION RESPONSE

```
(06)  <s12:Header>
(07)    <tmda:Action>
(08)      http://schemas.xmlsoap.org/ws/2004/01/eventing/
          SubscribeResponse
(09)    </tmda:Action>
(10)    <tmda:RelatesTo>
(11)      uuid:d7c5726b-de29-4313-b4d4-b3425b200839
(12)    </tmda:RelatesTo>
(13)    <tmda:ReferenceProperties> . . . </tmda:ReferenceProperties> ?
(14)    <tmda:To>http://www.example.com/MyEventSink</tmda:To>
(15)  </s12:Header>
(16)  <s12:Body>
(17)    <wse:SubscribeResponse>
(18)      <wse:Id>uuid:5005cfe6-c2c6-4296-9c3a-80b9ad111813</wse:Id>
(19)      <wse:Expires>P0Y0M0DT30H0M0S</wse:Expires>
(20)    </wse:SubscribeResponse>
(21)  </s12:Body>
(22) </s12:Envelope>
(23)
```

Lines (07-09) in Table 4 indicate this exemplary message is a response to a request to create a subscription, and lines (10-12) indicate that it is a response to the request of Table 3. Line 13 is a block of <ReferenceProperties> with one or more elements in it that are understood only by event source 106. For example an internal SubscriptionId and a second element denoting quality of service for this subscriber. Line (17) lists a unique identifier for this subscription, and line (18) indicates the subscription will expire in 30 hours unless renewed.

In view if this, event source 106 and subscriber 102 now have greater control over subscription management as compared to subscriber(s) in conventional pub-sub systems. Whatever interesting things are going on in the endpoint reference 114-2 (i.e., the context portion of reference property(ies) of the endpoint reference) can be completely opaque to subscriber 102. In some instances, this mechanism substantially simplifies subscriber 102 implementations.

Exemplary Use of Endpoint References for Topic Identification

In another implementation, subscriber 102 requests a list of topics from topic service 112. In this implementation, the topic service 112 is independent of the entity that sends out event notifications 128—e.g., event source 106. However, in another implementation, the topic service is the event source 106. A topic is an identifier that can be used by publishers and subscribers to refer to a same stream of event notifications. Every topic has a unique identifier that can be used to access service for that topic. In existing systems and methods the use of the address URI may need to be overloaded to carry additional information. This creates a tight coupling. This point has already been made, but it now applies to topics. Such modification to the destination URI of the topic source requires tight coupling between the subscriber and a topic provider, so that the subscriber can at least parse the topic source destination and topic name—the destination for a Web service message for placement in a transport, the name to identify the topic.

As already described, any context for use by an event source or topic source would either be serialized within the URI and/or inserted into a new data field of a subscription request. Incorporation of such information into a URI destination address and/or proprietary data field results in undesirably tight programmatic coupling between respective pub-sub components. This implementation of the systems and method for use of an endpoint reference 114 in a pub-sub system 100 addresses these conventional pub-sub system limitations.

In particular, rather than sending subscriber 102 a message, wherein the destination address of a topic source needs to be parsed to identify the address and a topic name, topic service 112 creates a list of topic names and respective topic sources, wherein each item in the list is a topic name and source pair encapsulated by respective endpoint reference 114-3. The endpoint address of each endpoint reference 114-3 identifies a respective topic source if needed (e.g., an event source 106 or publisher 124—although the publisher may remain anonymous). Each reference property portion identifies a respective topic name provided by the topic source. Topic service 112 embeds any context for a target pub-sub component (e.g., subscriber, topic source, event source, intermediary, and/or event sink) within respective reference properties. Topic service 112 communicates the list of endpoint reference(s) 114-3 as topic endpoint reference(s) 138 to subscriber 102.

Responsive to receiving topic endpoint reference(s) 138, subscriber encapsulates one or more of the endpoint references (encapsulated in topic endpoint reference(s) 138 message) identifying a topic of interest into a subscription request 126. Subscriber 102 communicates the subscription request 126 to event source 106 for registering a subscription corresponding to the one or more specified topic name(s) from the associated topic source(s). As described above, any context targeted to a respective pub-sub component is parsed in view of a respective schema 122.

An Exemplary Procedure

Figure 2:
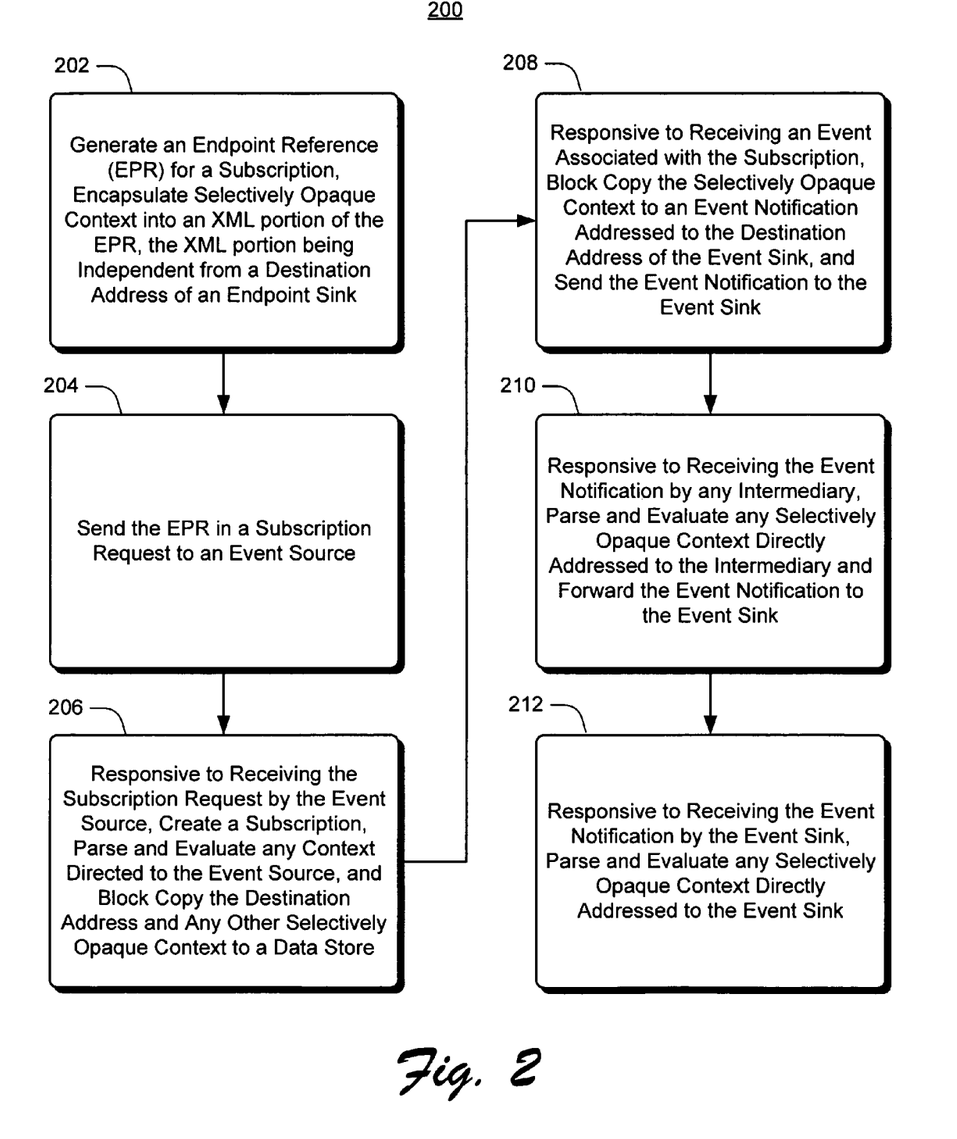
FIG. 2 illustrates an exemplary procedure to use endpoint reference for subscription in a publish-subscribe system of FIG. 1.

FIG. 2 illustrates an exemplary procedure 200 to use endpoint reference for subscription in a pub-sub system 100 of FIG. 1. For purposes of discussion, operations of the procedure 200 are discussed in relation to the components of FIG. 1. (All reference numbers begin with the number of the drawing in which the component is first introduced). At block 202, subscriber 102 generates endpoint reference 114-1 to register a subscription with event source 106. To this end, subscriber 102 specifies endpoint address 116 of the event sink 110. Subscriber 102 further inserts selectively opaque context into an XML portion of the endpoint reference. The XML portion (e.g., one or more respective reference properties 118) is independent from a destination address (e.g., address 116) of an endpoint sink 110. At block 204, subscriber 102 sends the subscription request 126 comprising endpoint reference 114-1 to event source 106 using TMD-addressing. At block 206, event source 106, responsive to receiving the subscription request 126 from subscriber 102, creates a subscription 130. This is accomplished in part by parsing and evaluating any context directed to the event source 106. Additionally, the endpoint address and any other selectively opaque context is block copied by event source 106 to a data store coupled to event source 106.

At block 208, responsive to receiving an event 132 from publisher 124, the event being associated with the subscription 130, event source 106 generates event notification 128. To this end, event source 106 block copies any selectively opaque context mapped to the subscription (via endpoint reference 114-1) from the data store to event notification 128. Event source 106 also block copies the endpoint address mapped to the subscription (via endpoint reference 114-1), which identifies event sink 110, to the destination address of event notification 128. At block 210, responsive to an intermediary 108 receiving event notification 128 in the normal flow of communication of event notification 128 to event sink 110, the intermediary parses and evaluates any selectively opaque context encapsulated by the event notification and directly addressed to the intermediary, and forwards event notification 128 to event sink 110. At block 212, responsive to receiving event notification 128 by event sink 110, event sink 110 parses and evaluates any selectively opaque context directly addressed to event sink 110.

In this manner, subscriber 102 generates and distributes selectively transparent/opaque context to any number of directly addressed pub-sub system 100 components. Additionally, since subscriber 102 does not generate a subscription message comprising proprietary embedded context, for example, context embedded within URI directed to the event source, the subscriber and event source are substantially programmatically uncoupled from one another, providing for lightweight implementations of the respective components.

Figure 3:
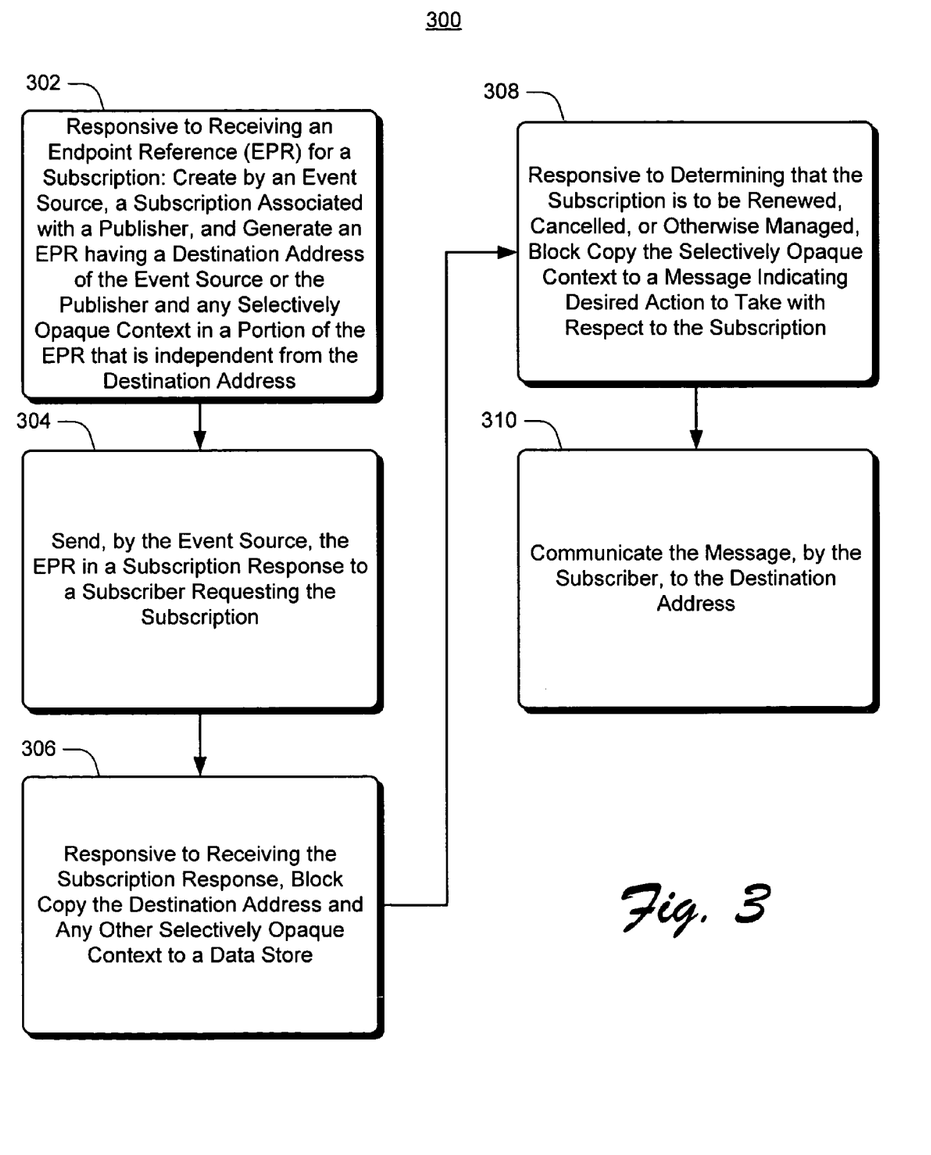
FIG. 3 illustrates an exemplary procedure for a subscriber to use an endpoint reference to directly manage a subscription in a publish-subscribe system.

FIG. 3 illustrates an exemplary procedure 300 for a subscriber to use an endpoint reference to directly manage a subscription in a pub-sub system. For purposes of discussion, operations of the procedure are discussed in relation to the components and system 100 of FIG. 1. (All reference numbers begin with the number of the drawing in which the component is first introduced). At block 302, responsive to receiving endpoint reference 114-1 from subscriber 102, event source 106 creates a subscription 130, and thereby, generates subscription response 134. The subscription response comprises endpoint reference 114-2, which in turn comprises an endpoint address of event source 106. The endpoint reference 114-2 further comprises any selectively opaque context that may be semantically meaningful to event source 106 and utilized to identify the subscription 130. Endpoint reference 114-2 represents the selectively opaque context in a data field that is independent of the endpoint address in the endpoint reference 114-2. At block 304, event source 106 sends the subscription response 136 to subscriber 102 (subscriber 102 having requested the subscription). At block 306, subscriber 102 responsive to receiving subscription response 136, block copies the endpoint address and any selectively opaque context portions of the encapsulated endpoint reference 114-2 to a data store—the data store being coupled to subscriber 102.

At block 308, responsive to a subscriber 102 determining that a subscription is to be renewed, canceled, or otherwise managed, subscriber 102 block copies the endpoint address identified by endpoint reference 114-2 to renew/canceled/modify message 136. Subscriber 102 also block copies from the data store any selectively opaque context associated with endpoint reference 114-2 into renew/cancel/modify message 136. At block 310, subscriber 102 communicates renew/canceled/modified message 136 to the endpoint address, which in this implementation, identifies event source 106. In this manner, subscriber 102 maintains substantial control over managing the subscription independent of using event source 106 as a broker to manage the subscription.

Figure 4:
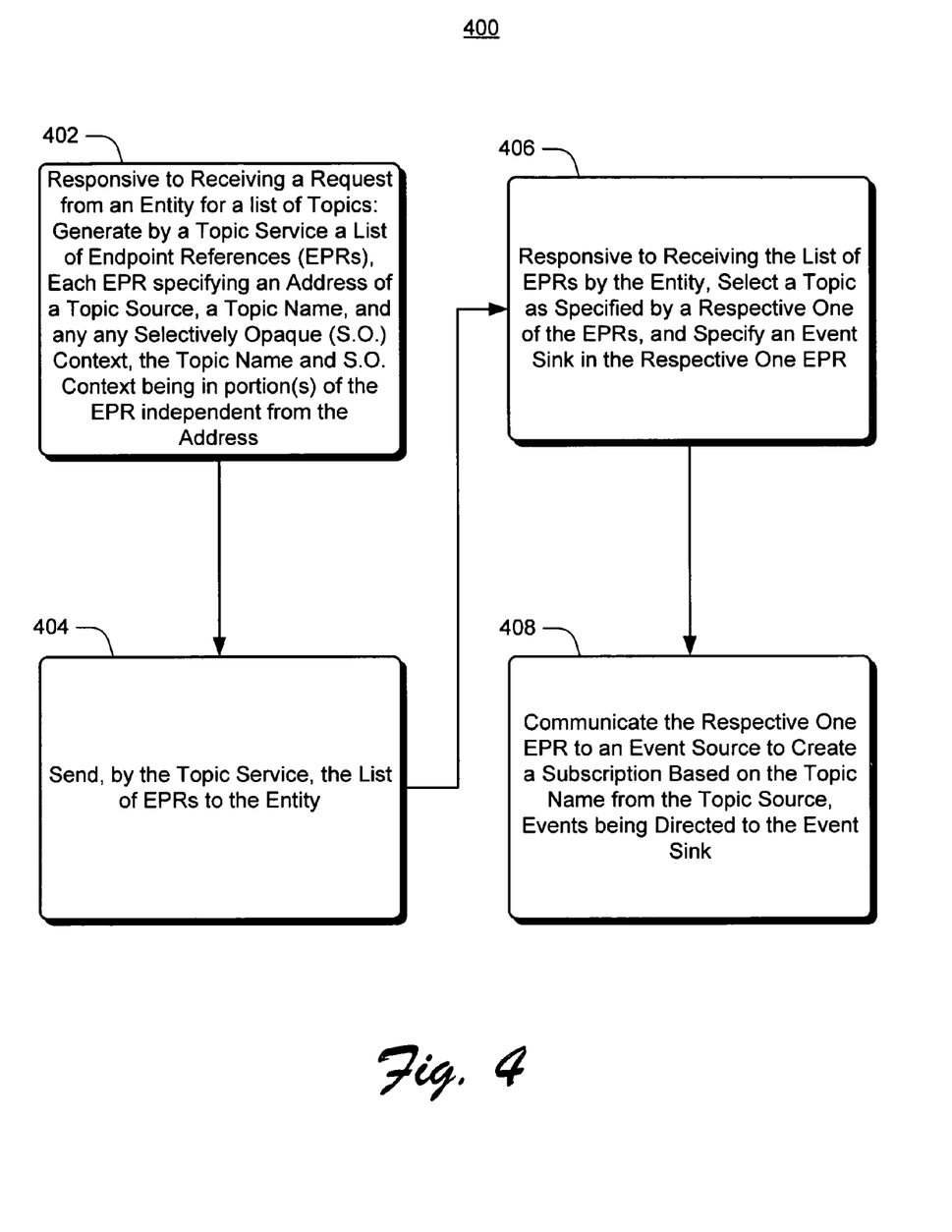
FIG. 4 illustrates an exemplary procedure for a subscriber to use an endpoint reference as a topic identifier in a publish-subscribe system.

FIG. 4 illustrates an exemplary procedure 400 for a subscriber to use an endpoint reference as a topic identifier in a pub-sub system. A topic identifier comprises a topic source and a topic name for topic subscription. For purposes of discussion, operations of the procedure are discussed in relation to the components and system 100 of FIG. 1. (All reference numbers begin with the number of the drawing in which the component is first introduced). At block 302, topic service 112, responsive to receiving a request from subscriber 102 for a list of topics, generates one or more endpoint reference(s) 114-3. Each endpoint reference 114-3 specifies an endpoint address of a topic source. A reference property portion of the endpoint reference 114-3 comprises a topic name associated with the topic source. Another endpoint reference portion of the endpoint reference 114-3 comprises any selectively opaque context. The reference property(ies) portions(s) of the endpoint reference 114-3 are independent and distinct data fields from the endpoint address data field.

At block 304, topic service 112 communicates a list of topic endpoint reference(s) 138 to subscriber 102. Subscriber 102, responsive to receiving a list the endpoint reference(s), selects a topic source/name pair as specified by the respective one of the endpoint reference(s). For purposes of discussion of this implementation, the respective one endpoint reference is represented by endpoint reference 114-1. Subscriber 102 specifies an event sink 110 as an endpoint address of endpoint reference 114-1. The selected topic source and the topic name are block copied into respective reference properties 118. Any selectively opaque context associated with the selected topic source/name pair is block copied into another reference property of the endpoint reference 114-1. At block 306, subscriber 102 communicates endpoint reference 114-1 to event source 106, and thereby directs event source 106 to create a subscription from the topic source/name pair presented in endpoint reference 114-1, events of which are to be forwarded to the endpoint address.

An Exemplary Operating Environment

Figure 5:
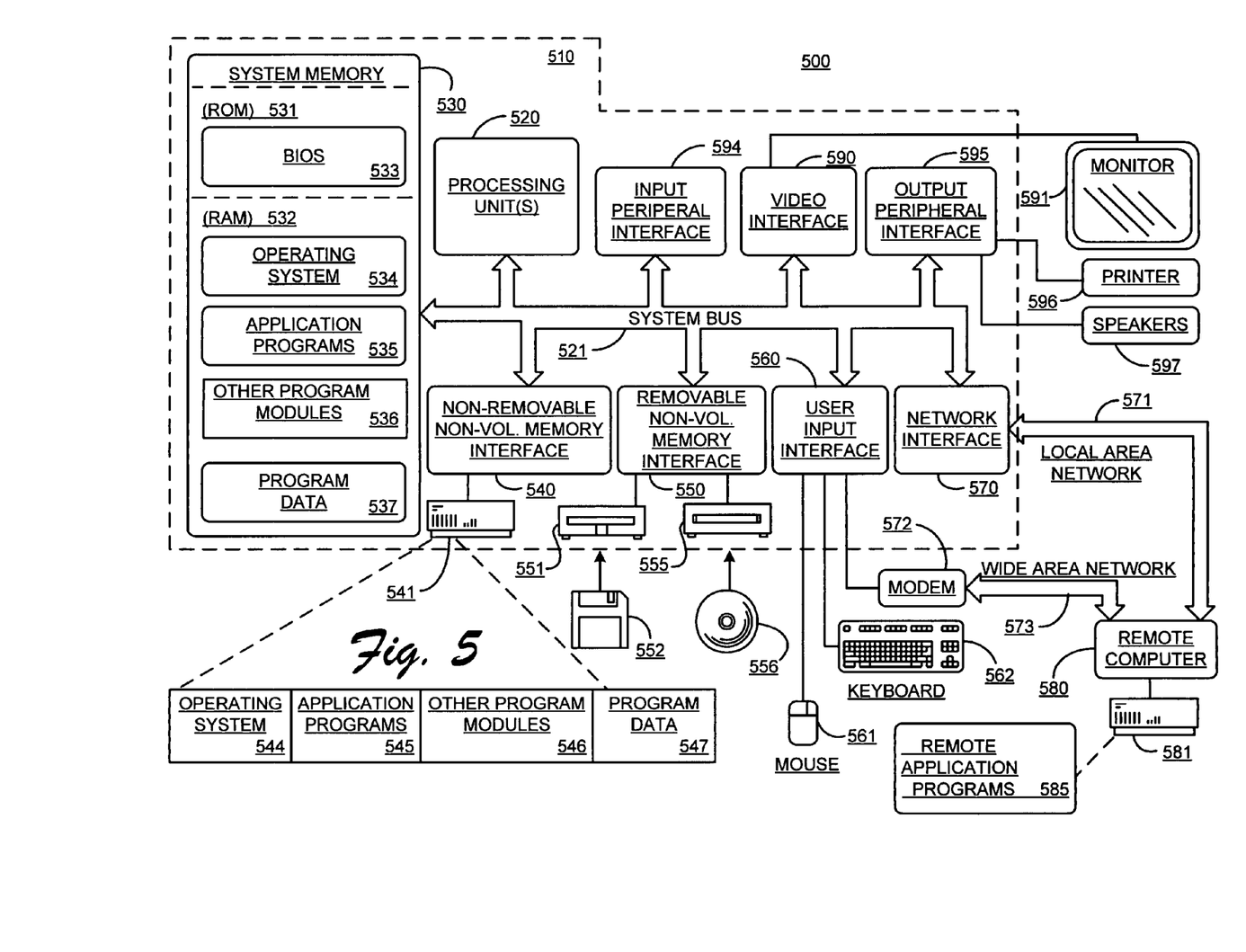
FIG. 5 illustrates an example of a suitable publish-subscribe computing environment in which the systems and methods for using endpoint references may be fully or partially implemented.

FIG. 5 illustrates an example of a suitable computing environment 500 on which the system of FIG. 1 and the methodology of FIGS. 2-4 for using endpoint references may be fully or partially implemented. Exemplary computing environment 500 is only one example of a suitable computing environment and is not intended to suggest any limitation as to the scope of use or functionality of systems and methods the described herein. Neither should computing environment 500 be interpreted as having any dependency or requirement relating to any one or combination of components illustrated in computing environment 500.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 5, an exemplary system providing content propagation for enhanced document retrieval includes a general purpose computing device in the form of a computer 510. The following described aspects of computer 510 are exemplary implementations of a subscriber 102, an event source 106, an intermediary 108, and/or an event sink 110, each of which were described above in reference to FIG. 1. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Exemplary program modules 535 and/or 536, and program data 537 include one or more computer-program modules and program data 537 to use endpoint references 114 (FIG. 1) in a pub-sub system 100 of FIG. 1. For this reason, program modules and program data are described in reference to aspects of FIG. 1. Program modules present in any component of system 100 are a function of the component implementation. Components include, for example, subscriber 102, event source 106, an intermediary 108, and/or event sink 110. As such, program modules 535 and/or 536 may respectively comprise one or more respective modules to create an endpoint reference 114 (FIG. 1), bind an endpoint reference 114 to a transport protocol such as SOAP via TMD-addressing, validate and parse a markup language such as XML in view of a respective schema 122, etc. Program data 537 is a function of a pub-sub component's respective implementation, and as such may respectively comprise combinations of endpoint reference(s) 114, schema(s) 122, messages such as subscription request 126, subscription response 134, event notification 128, topic endpoint reference message 138, and/or the like.

Computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 5130, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that they are at least different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device may also be connected to the system bus 521 via an interface, such as a video interface 590. In addition to the monitor, computers may also include other peripheral output devices such as speakers 597 and printer 596, which may be connected through an output peripheral interface 595.

The computer 510 operates in a networked environment using logical connections to one or more remote computers, such as a remote computer 580. In this implementation, the remote computer 580 may be a subscriber, event source, intermediary, and/or event sink, and typically includes many or all of the elements described above relative to the computer 510, although only a memory storage device 581 has been illustrated in FIG. 5. The remote computer 580 may also be a personal computer, a server, a router, a network PC, a peer device or other common network node. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. The network connections shown are exemplary and other means of establishing a communications link between the computers may be used.

CONCLUSION

Although the systems and methods for using endpoint references in a pub-sub system have been described in language specific to structural features and/or methodological operations or actions, it is understood that the implementations defined in the appended claims are not necessarily limited to the specific features or actions described. For instance, an event source 106 may comprise any combination of a publisher event broker and/or an event originator. Similarly, a publisher 124 may comprise any combination of an event originator and/or a publisher event broker. Accordingly, the specific features and actions are disclosed as exemplary forms of implementing the claimed subject matter.

The invention claimed is:

1. A computer-implemented method for using an endpoint reference in a message for transmission to/from network nodes participating in a publish-subscribe ("pub-sub") system, the computer-implemented method comprising:
   creating, in the message, an endpoint reference to identify an endpoint node in the pub-sub system, the endpoint reference comprising an address of the endpoint node to which messages published by the pub-sub system will be sent by one or more nodes in the pub-sub system; and
   encapsulating two or more contexts into the endpoint reference, wherein
      a first context in the endpoint reference referring to a first node or set of nodes of the pub-sub system and being decodable by the first node or set of nodes, but not decodable by one or more other nodes of the pub-sub system,
      a second context in the endpoint reference referring to a second node or set of nodes of the pub-sub system and being decodable by the second node, but not decodable by one or more other nodes of the pub-sub system; and
      whereby each context is transparent to its respective node or set of nodes and is selectively opaque to one or more other pub-sub system nodes.

2. A method as recited in claim 1, wherein the endpoint is an event sink, event source, a publisher, or a topic source.

3. A method as recited in claim 1, further comprising binding the endpoint reference to a transport protocol such that a source address and a destination address of a message that encapsulates the endpoint reference is decoupled from the transport protocol, the source and destination addresses not being the address of the endpoint.

4. A method as recited in claim 3, wherein the binding is based on endpoint reference addressing (TMD-addressing).

5. A method as recited in claim 1, further comprising sending a subscription request to an event source, the subscription request encapsulating the endpoint reference, the subscription request directing the event source to transmit event notification message(s) to an event sink responsive to receiving particular event(s), each event notification comprising appropriate portion(s) of the selectively opaque context.

6. A method as recited in claim 1, wherein the endpoint is a publisher, and further comprising sending, by an event source, a subscription response to a subscriber, the subscription response encapsulating the endpoint reference, the subscription response directing the subscriber to communicate the endpoint reference to the endpoint when managing a subscription associated with the endpoint and appropriate portion(s) of the selectively opaque context.

7. A method as recited in claim 1, wherein the endpoint is a topic source, wherein a portion of the selectively opaque context identifies a topic name corresponding to the topic source, and wherein the method further comprises:
   sending, by a topic service the endpoint reference to a subscriber; and
   responsive to receiving the endpoint, reference, communicating the endpoint reference to an event source to register a subscription to the topic name, a publisher of the topic name being identified by the topic source.

8. A computer-readable storage media comprising computer-executable instructions executed by a computing device for using an endpoint reference in a publish-subscribe ("pub-sub") system, the computer-executable instructions comprising instructions for:
   creating, in a message, an endpoint reference to identify an endpoint node in the pub-sub system, the endpoint reference comprising an address of the endpoint node to which messages published by the pub-sub system will be sent by one or more nodes in the pub-sub system; and
   inserting two or more contexts specified by a markup language into an element of the endpoint reference, wherein
      a first context in the endpoint reference referring to a first node or set of nodes of the pub-sub system and being decodable by the first node or set of nodes, but not decodable by one or more other nodes of the pub-sub system,
      a second context in the endpoint reference referring to a second node or set of nodes of the pub-sub system and being decodable by the second node, but not decodable by one or more other nodes of the pub-sub system; and
      whereby each context is transparent to its respective node or set of nodes and is selectively opaque to one or more other pub-sub system nodes.

9. A computer-readable storage media as recited in claim 8, and further comprising instructions for sending a subscription request to an event source, the subscription request encapsulating the endpoint reference, the subscription request directing the event source to transmit event notification message(s) to an event sink responsive to receiving particular event(s) from a publisher, the endpoint being the event sink, each event notification comprising appropriate portion(s) of the selectively opaque context.

10. A computer-readable storage media as recited in claim 8, wherein the endpoint is a publisher, and further comprising instructions for sending, by an event source, a subscription response to a subscriber, the subscription response encapsulating the endpoint reference, the subscription response directing the subscriber to communicate the endpoint reference to the endpoint when managing a subscription associated with the endpoint and appropriate portion(s) of the selectively opaque context.

11. A computer-readable storage media as recited in claim 8, wherein the endpoint is a topic source, wherein a portion of the selectively opaque context identifies a topic name corresponding to the topic source, and further comprising instructions for:
    sending, by a topic service the endpoint reference to a subscriber;
    responsive to receiving the endpoint reference, communicating the endpoint reference to an event source to register a subscription to the topic name, a publisher of the topic name being identified by the topic source.

12. A computer-readable storage media as recited in claim 8, wherein the endpoint is an event sink or an event source.

13. A computer-readable storage media as recited in claim 12, wherein the event source is a topic service or a non-broker publisher.

14. A computer-readable storage media as recited in claim 8, further comprising instructions for binding the endpoint reference to a transport protocol, the binding being performed such that a source address and a destination address of a message that encapsulates the endpoint reference is decoupled from the transport protocol, the source and destination address not being the address of the endpoint.

15. A computer-readable storage media as recited in claim 14, wherein the binding is based on TMD-addressing.

16. A computing device comprising:
    a processor; and
    a memory coupled to the processor, the memory comprising computer-program instructions executable by the processor for:
    creating, in a message, an endpoint reference to identify an endpoint node in a publish-subscribe ("pub-sub") system, the endpoint reference comprising an address of the endpoint node to which messages published by the pub-sub system will be sent by one or more nodes in the pub-sub system; and
    encapsulating two or more contexts into the endpoint reference, wherein
        a first context in the endpoint reference referring to a first node or set of nodes of the pub-sub system and understanding what the context means by the first node or set of nodes but not understanding what the context means by one or more other nodes of the pub-sub system,
        a second context in the endpoint reference referring to a second node or set of nodes of the pub-sub system and understanding what the context means by the second node but not understanding what the context means by one or more other nodes of the pub-sub system, whereby each context is transparent to its respective node or set of nodes and is selectively opaque to one or more other pub-sub system nodes.

17. A computing device as recited in claim 16, wherein the computing device is a subscriber, an event source, or a topic service.

18. A computing device as recited in claim 16, wherein the endpoint is an event sink, an event source, a publisher, or a topic source.

19. A computing device as recited in claim 16, and further comprising instructions for binding the endpoint reference to a transport protocol, the binding being performed such that a source address and a destination address of a message that encapsulates the endpoint reference is decoupled from the transport protocol, the source and destination address not being the address of the endpoint.

20. A computing device as recited in claim 19, wherein the binding is based on TMD-addressing.

21. A computing device as recited in claim 16, and further comprising instructions for sending a subscription request to an event source, the subscription request encapsulating the endpoint reference, the subscription request directing the event source to transmit event notification message(s) to an event sink responsive to receiving particular event(s) from a publisher, the endpoint being the event sink, each event notification comprising appropriate portion(s) of the selectively opaque context.

22. A computing device as recited in claim 16, wherein the endpoint is a publisher, and further comprising instructions for sending, by an event source, a subscription response to a subscriber, the subscription response encapsulating the endpoint reference, the subscription response directing the subscriber to communicate the endpoint reference to the endpoint when managing a subscription associated with the endpoint and appropriate portion(s) of the selectively opaque context.

23. A computing device as recited in claim 16, wherein the endpoint is a topic source, wherein a portion of the selectively opaque context identifies a topic name corresponding to the topic source, and further comprising instructions for:
    sending, by a topic service the endpoint reference to a subscriber;
    responsive to receiving the endpoint reference, communicating the endpoint reference to an event source to register a subscription to the topic name, a publisher of the topic name being identified by the topic source.

24. A computing device comprising:
    means for creating a message by a processor;
    means for creating in the message by the processor, an endpoint reference to identify an endpoint node in a publish-subscribe ("pub-sub") system, the endpoint reference comprising an address of the endpoint node;
    means for sending messages published by the pub-sub system by one or more nodes in the pub-sub system;
    means for encapsulating two or more contexts into the endpoint reference by the processor, wherein
        a first context in the endpoint reference referring to a first node or set of nodes of the pub-sub system and understanding what the context means by the first node or set of nodes but not understanding what the context means by one or more other nodes of the pub-sub system,
        a second context in the endpoint reference referring to a second node or set of nodes of the pub-sub system and understanding what the context means by the second node, but not understanding what the context means by one or more other nodes of the pub-sub system,
        whereby each context is transparent to its respective node or set of nodes and is selectively opaque to one or more other pub-sub system nodes; and
    means for displaying messages on a monitor.

25. A computing device as recited in claim 24, wherein the endpoint is an event sink, a publisher, or a topic source.

26. A computing device as recited in claim 24, and further comprising means for binding the endpoint reference to a transport protocol, the binding being performed such that a source address and a destination address of a message that encapsuintes the endpoint reference is decoupled from the transport protocol, the source and destination address not being the address of the endpoint.

27. A computing device as recited in claim 24, and further comprising means for binding the endpoint reference to the transport protocol as a function of TMD-addressing.

28. A computing device as recited in claim 24, wherein the computing device is a subscriber that further comprises means for sending a subscription request to an event source, the subscription request encapsulating the endpoint reference, the subscription request directing the event source to transmit event notification message(s) to an event sink responsive to receiving particular event(s) from a publisher, the endpoint being the event sink, each event notification comprising appropriate portion(s) of the selectively opaque context.

29. A computing device as recited in claim 24, wherein computing device is an event source, and wherein the endpoint is a publisher, and wherein the event source further comprises means for sending a subscription response to a subscriber, the subscription response encapsulating the endpoint reference, the subscription response directing the subscriber to communicate the endpoint reference to the endpoint when managing a subscription associated with the endpoint and appropriate portion(s) of the selectively opaque context.

30. A computing device as recited in claim 24, wherein the computing device is a topic service, wherein the endpoint is a topic source, wherein a portion of the selectively opaque context identifies a topic name corresponding to the topic source, and wherein the topic service further comprises:

means for sending, by a topic service the endpoint reference to a subscriber;

responsive to receiving the endpoint reference, means for communicating the endpoint reference to an event source to register a subscription to the topic name, a publisher of the topic name being identified by the topic source.

\* \* \* \* \*